(12) United States Patent
Baek et al.

(10) Patent No.: US 12,380,192 B2
(45) Date of Patent: Aug. 5, 2025

(54) BIOMETRIC AUTHENTICATION METHOD CAPABLE OF SECURELY MANAGING TEMPLATE PIECES OF BIOMETRIC INFORMATION WITH ENCRYPTION

(71) Applicant: UNIONCOMMUNITY CO., LTD., Seoul (KR)

(72) Inventors: Young Hyun Baek, Seoul (KR); Yo Shik Shin, Seoul (KR)

(73) Assignee: UNION BIOMETRICS CO., LTD., Seoul (KR)

( * ) Notice: Subject to any disclaimer, the term of this patent is extended or adjusted under 35 U.S.C. 154(b) by 159 days.

(21) Appl. No.: 18/468,341

(22) Filed: Sep. 15, 2023

(65) Prior Publication Data
US 2024/0143717 A1    May 2, 2024

(30) Foreign Application Priority Data
Oct. 27, 2022    (KR) .................. 10-2022-0140551

(51) Int. Cl.
*G06F 21/32*    (2013.01)
*G06F 21/45*    (2013.01)
*G06F 21/62*    (2013.01)

(52) U.S. Cl.
CPC .............. *G06F 21/32* (2013.01); *G06F 21/62* (2013.01); *G06F 2221/2117* (2013.01)

(58) Field of Classification Search
CPC .......... G06F 21/32; G06F 21/45; G06F 21/62; G06F 2221/2117
See application file for complete search history.

(56) References Cited

U.S. PATENT DOCUMENTS

| | | | |
|---|---|---|---|
| 9,935,947 B1 * | 4/2018 | Machani | H04L 63/0861 |
| 11,341,221 B2 * | 5/2022 | Sim | G06F 21/32 |
| 11,449,588 B2 * | 9/2022 | Kim | G06Q 20/206 |
| 2018/0129797 A1 * | 5/2018 | Rush | G10L 17/00 |

FOREIGN PATENT DOCUMENTS

| | | | | |
|---|---|---|---|---|
| CN | 108352024 A | * | 7/2018 | ............ G06F 21/32 |
| KR | 20120075700 A | | 7/2012 | |
| KR | 102424040 B1 | | 7/2022 | |
| WO | WO-2021167534 A1 | * | 8/2021 | |
| WO | WO-2022010338 A1 | * | 1/2022 | ............ G06F 21/32 |

* cited by examiner

*Primary Examiner* — Jayesh M Jhaveri
(74) *Attorney, Agent, or Firm* — STIP Law Group, LLC

(57) ABSTRACT

Disclosed is a biometric authentication method capable of securely managing template pieces of biometric information with encryption. The Template for Registration of biometric information of this invention is divided into template pieces for management, but it is periodically encrypted with periodically changed encryption algorithm to enhance security. It presents a method of reassembling the template pieces into the original template to performing the authentication process.

4 Claims, 3 Drawing Sheets

BIOMETRIC AUTHENTICATION METHOD CAPABLE OF SECURELY MANAGING TEMPLATE PIECES OF BIOMETRIC INFORMATION WITH ENCRYPTION

This research was supported by Information and Communication and Broadcasting Research and Development projects through the Institute of Information & Communications Technology Planning & Evaluation (IITP) funded by the Ministry of Science and ICT (MSIT) (No. 2022001115).

CROSS-REFERENCE TO RELATED APPLICATIONS

This application claims priority from Korean Patent Application No. 10-2022-0140551, filed on Oct. 27, 2022, in the Korean Intellectual Property Office, the disclosure of which is incorporated herein by reference in its entirety.

BACKGROUND OF THE INVENTION

Field of the Invention

The present invention relates to a biometric authentication method of a biometric authentication system in which template of biometric information are divided into a set of template pieces and managed, but security is enhanced by periodically encrypting the template pieces.

Description of the Related Art

Biometrics using a user's fingerprint, face, iris, vein, voice, etc. is widely used as a means of user authentication because of its uniqueness, difficulty in cloning, and no risk of loss.

In the case of biometric authentication, when a user attempts to authenticate by contacting his fingerprint, iris, or vein with the authentication terminal, the authentication terminal obtains the biometric information from the user to compare with the biometric information stored on the server, in order to confirm whether the user is identical to a registered one.

Because biometric information cannot be changed, if biometric information stored on the server is leaked by hacking, the damage is more serious than other authentication methods. In this regard, biometric authentication is not completely safe.

The applicant has a Korean Patent No. 10-1178552 on how to safely store biometric information in a server or database. According to the patented invention, the server divides the user's biometric information into a plurality of divided biometric information and then stores the divided information. When authentication process starts, the server temporarily synthesizes the divided biometric information back into the original biometric information. So the security of biometric information stored and managed on a server was enhanced.

Related Art Documents

[Patent Documents] (Patent Document 1) Korean Patent Publication No. 10-2012-0075700 (Title: Biometric Authentication System and Authentication Method thereof)

Technical Problem

The present invention is directed to providing a biometric authentication method of a biometric authentication system that manages templates of biometric information by dividing them into template pieces but periodically encrypts them to enhance security.

Technical Solution

One aspect of the present invention provides a biometric authentication method using the user's biometric information. The method comprises a user registration process and a user authentication process. The registration process may comprise; acquiring, by a terminal, biometric information of the user to be registered by using a biometric information input unit of the terminal, generating a Template for Registration, which is characteristic data of the biometric information like minutiae extracted from a fingerprint image, dividing the Template for Registration into a set of template pieces by using a preset division algorithm, and generating a Non-identification Key, an identification code for the set of template pieces; generating, by the terminal, User Registration Information including User Identification Information which the user inputs, the set of template pieces, and the Non-identification Key, and providing the User Registration Information to a registration server in order to request user registration; and after receiving the User Registration Information, converting, by an authentication management server, the set of template pieces into Encryption-registration Information by encrypting with an encryption key according to a preset encryption algorithm, and storing the converted User Registration Information together with the encryption key in a data storage unit, wherein the encryption algorithm is changed periodically. The User Registration Information comprises the Encryption-registration Information instead of the set of template pieces.

The authentication process may comprise; requesting, by the terminal, authentication of a requester to the authentication management server by providing a Template for Authentication along with the Non-identification Key, which the Template for Authentication is acquired from the requester; extracting, by the authentication management server, Encryption-registration Information mapped to the authentication-requested Non-identification Key from the data storage unit, decoding the extracted Encryption-registration Information with a set of template pieces by using an encryption key mapped to the authentication-requested Non-identification Key, and reassembling the decoded set of template pieces into the Template for Registration according to a preset reassembly algorithm; and authenticating the requester, by the authentication management server, by comparing the Template for Authentication with the Template for Registration reassembled, and discarding the Template for Authentication and the Template for Registration reassembled.

In an embodiment, in order for acquiring the Non-identification Key used for the requesting authentication, the step for requesting authentication of the user may comprise; providing, by the terminal, the User Identification Information to the authentication management server to request an inquiry of Non-identification Key, wherein the User Identification Information is the information that the user who requested authentication inputs through an identification information input unit; and searching, by the authentication management server, the Non-identification Key mapped to the User Identification Information provided by the terminal and providing the Non-identification Key to the terminal.

In an embodiment, the authentication method may further comprise; before the terminal generates the User Registration Information, receiving, by the terminal, the User Identification Information from the user to be registered, and inquiring the Non-identification Key to the authentication management server to determine whether the user is a pre-registered user or not.

In an embodiment, in the requesting authentication of the user, the terminal divides the Template for Authentication into a set of Template for Authentication pieces using the preset division algorithm and provides the set of Template for Authentication pieces to the authentication management server. And in the reassembling the decoded set of template pieces into the Template for Registration, the authentication management server uses the reassembly algorithm to reassemble the set of Template for Authentication pieces into the Template for Authentication.

Advantageous Effects

The biometric authentication method according to the present invention not only divides the template extracted from the user's biometric information into a set of template pieces for management but also prevents the leakage of personal information against accidents such as hacking by encrypting template pieces according to an encryption policy that periodically changes the algorithm.

In this invention, even if all registered user templates are divided into pieces and encrypted to store, since a 1:1 authentication process is performed after first inquiring about the user with the User Identification Information, there is no delay in decoding the encrypted template pieces and reassembling to the original template.

MODES OF THE INVENTION

Figure 1:
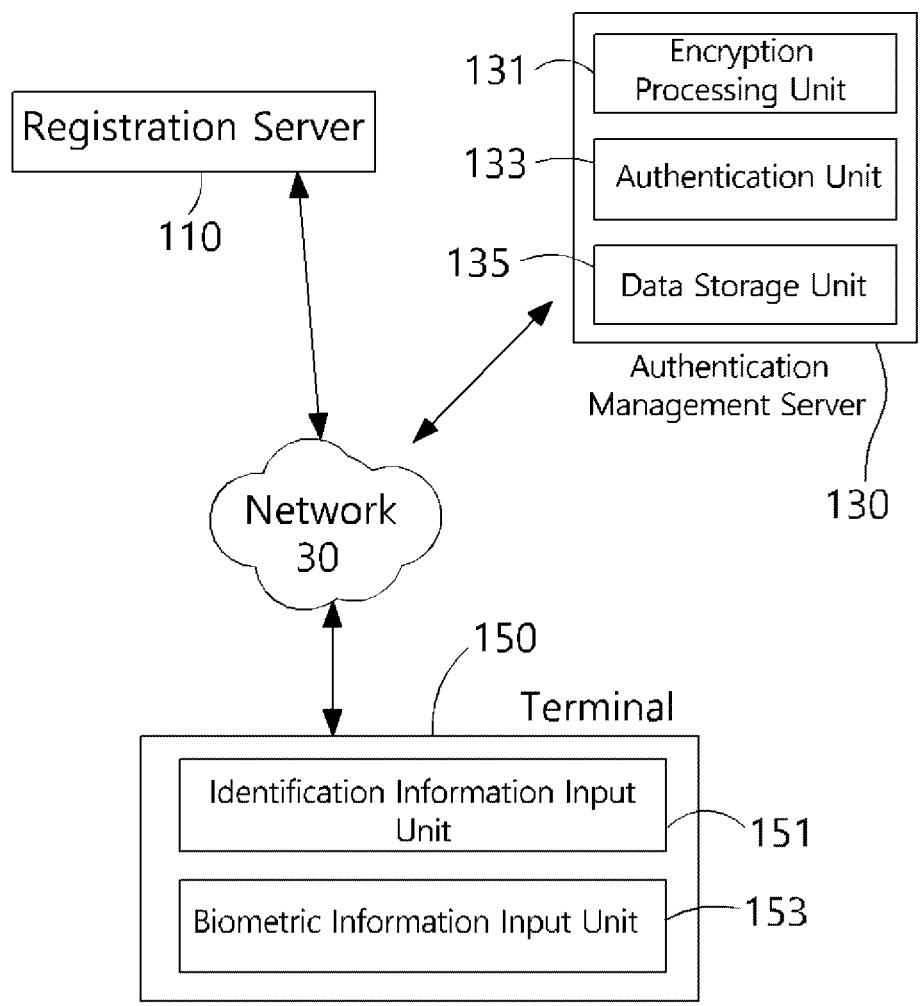
FIG. 1 is a block diagram of a biometric authentication system according to an embodiment of the present invention.

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

Hereinafter, the present invention will be described in more detail with reference to the drawings.

Referring to FIG. 1, the biometric authentication system 100 of the present invention comprises a registration server 110, an authentication management server 130, and a terminal 150 which are interconnected through a network 10, and perform user authentication using the user's biometric information. The biometric information of the present invention may be any type of biometric information that can be obtained from the user such as a fingerprint image, an iris image, and a face image, and may also be an animal's nose pattern image.

The registration server 110 receives a User Registration Information from the terminal 150 and registers the user by storing the User Registration Information. Receiving a user's authentication request from the terminal 150, the registration server 110 performs an authentication process by comparing the authentication information to the previously registered User Registration Information. In this invention, the User Registration Information includes User Identification Information, a set of template pieces, and a Non-identification Key, and is generated by the terminal 150 and provided to the registration server 110.

User Identification Information is information to identify the user, which is not biometric information, and the user may directly input the User Identification Information to terminal 150. For example, at least one of information that the user can input, such as a user name, resident number, employee number, and driver's license number, can be used as User Identification Information. Alternatively, a unique identification code given to the user by terminal 150 or the registration server 110 according to a certain management algorithm may also be the User Identification Information.

A template is characteristic data extracted from user biometric information, like for example fingerprint minutiae extracted from a fingerprint image. In the present invention, a template is generated for user registration procedure or user authentication procedure. A template for user registration is called a Template for Registration, and, as explained below again, a template generated from biometric information for user authentication during the authentication procedure is called a Template for Authentication. A set of template pieces is a division of the Template for Registration divided into multiple (e.g., two) pieces using a preset division algorithm. The reassembly algorithm used to reassemble into a Template for Registration in response to the division algorithm is operated by the authentication management server 130 as described below. For security on system hacking or data transmission, the present invention uses a method of storing and transmitting the set of template pieces instead of the Template for Registration by splitting. As will be explained again below, the User Authentication Information generated by the terminal 150 and provided to the authentication management server 130 in the authentication procedure also includes a Template for Authentication and the Non-identification Key. According to an embodiment, the Template for Authentication may also be divided into a set of template pieces by the same algorithm as the division algorithm. Meanwhile, in the following, all of the Template for Registrations, Template for Authentications, and template pieces are collectively referred to as biological information templates.

The Non-identification Key is generated by the terminal 150 as an identification code of a Template for Registration or a set of template pieces. For example, terminal 150 may divide the Template for Registration into a set of template pieces and assign a new Non-identification Key to identify a newly created set of template pieces. The Non-identification Key may be generated in various ways. For example, a Non-identification Key can be generated by combining a common code (e.g., 3 Bytes) and a random number (e.g., 16 Bytes), and if necessary, a timestamp (e.g., 14 Bytes) can be further attached. Since the Non-identification Key using just random numbers cannot identify a user by itself, there is an advantage that there is no problem of security personal information leakage even if the Key has been exposed by hacking.

When the registration server 110 receives a User Registration Information from the terminal 150 and completes user registration, the User Registration Information is stored in the authentication management server 130.

The authentication management server 130 comprises an encryption processing unit 131, an authentication unit 133, and a data storage unit 135 and receives and manages User Registration Information that the registration server 110 sends.

The encryption processing unit 131 extracts a set of template pieces from the User Registration Information and encodes it into encrypted code, Encryption-registration Information, according to the encryption algorithm. The encryption processing unit 131 stores the Encryption-registration Information together with the encryption key at the data storage unit 135. The encryption processing unit 131 periodically changes the encryption algorithm for data security and changes the previous Encryption-registration Information pre-stored into a new Encryption-registration Information according to a new encryption algorithm. The User Identification Information and the Non-identification Key are stored in the data storage unit 135 without encrypting. Therefore, when a user is registered, Encryption-registration Information, an encryption key, a Non-identification Key, and User Identification Information are stored in the data storage unit 135 in a state that all is mapped to the corresponding User Identification Information.

The authentication unit 133 controls a user authentication procedure. The authentication procedure of this invention is 1:1 authentication which searches in advance the User Registration Information in the data storage unit 135 by using User Identification Information, and compares the Template for Registration of the searched user with a Template for Authentication newly acquired for authentication procedure by 1:1. Therefore, the authentication of this invention is not 1:n authentication so that doesn't have to compare with all the Template for Registration of all previously registered users to find similar or identical template.

For the authentication procedure, the authentication unit 133 reassembles the Template for Registration registered in the name of the user who requests authentication and then authenticates the user by comparing the reassembled Template for Registration with the Template for Authentication provided by terminal 150. If the matching score between the Template for Registration and the Template for Authentication exceeds a predetermined level, it is judged that the user requesting authentication is a registered user and the authentication has been successful, and if it does not reach the predetermined level, the authentication is judged to have failed. First of all, when the authentication unit 133 receives the Non-identification Key of the user who requested authentication from the terminal 150, the authentication unit 133 extracts Encryption-registration Information mapped to the Non-identification Key from the data storage unit 135 and reassembles the Template for Registration by using the extracted Encryption-registration Information. The terminal 150 includes a Template for Authentication and the Non-identification Key in the User Authentication Information and transmits it to the authentication management server 130.

Meanwhile, according to an embodiment, the terminal 150 may provide a set of Template for Authentication pieces instead of the Template for Authentication to the authentication management server 130. When the set of Template for Authentication pieces is provided, the authentication unit 133 must reassemble the set of Template for Authentication pieces into the Template for Authentication.

In order to reassemble the Template for Registration, the authentication unit 133 ① extracts the user's Encryption-registration Information from the data storage unit 135 by using the Non-identification Key contained in the User Authentication Information, ② decodes the Encryption-registration Information into a set of template pieces, and then ③ reassembles the set of template pieces into the Template for Registration. The reassembly algorithm is an algorithm that restores the template pieces to the original template according to the preset algorithm. The reassembly algorithm may be implemented in various ways in response to the division algorithm.

The authentication unit 133 provides the authentication result to the terminal 150 and discards the Template for Registration and the Template for Authentication temporarily used for the authentication procedure.

The authentication procedure of the present invention is 1:1 authentication that searches in advance who the user requested for authentication is and compares the Template for Registration of the searched user with the Template for Authentication. When the terminal 150 provides User Identification Information for the authentication procedure, the authentication unit 133 may searches a Non-identification Key mapped to the User Identification Information and provide the searched Non-identification Key to the terminal 150.

The terminal 150 comprises an identification information input unit 151 and a biometric information input unit 153, and can be any terminal that can obtain biometric information from the user and access the registration server 110 through the network 10. For example, the terminal 150 may be implemented in the form of an access controller installed at an entrance door of a building.

The identification information input unit 151 is a means that the user can input the User Identification Information. A keypad, a magnetic card reader, or an RFID reader can be used as the identification information input unit 151.

The biometric information input unit 153 is a means that obtains the biometric information from the user. The biometric information input unit 153 may be implemented in various types known as prior art and be different depending on the biometric information to be used. For example, a fingerprint sensor capable of obtaining a fingerprint image or a camera capable of generating a face or iris image may be representative examples of the biometric information input unit 153.

For user registration, the terminal 150 generates a Template for Registration using a biometric information input unit 153, divides the Template for Registration into a set of template pieces using a division algorithm, assigns a Non-identification Key, and requests user registration by providing User Registration Information to the registration server 110. The User Registration Information comprises the User Identification Information, the set of template pieces and the Non-identification Key.

When a user requests authentication, the terminal 150 receives User Identification Information from the user through the identification information input unit 151 and provides the User Identification Information to the authentication management server 130 to inquiry the user's Non-identification Key. When a Non-identification Key is provided, the user is a pre-registered user, so the terminal 150 generates a Template for Authentication by using the biometric information input unit 153 and requests user authentication to the authentication management server 130 by providing the User Authentication Information including the Template for Authentication and the Non-identification Key. If the Non-identification Key is not provided from the authentication management server 130, the terminal 150 determines that the user is not a registered user, and displays the inquiry result to the user. In this case, the terminal 150 may automatically proceed with the registration procedure according to the embodiment.

According to an embodiment, the terminal 150 may divide the Template for Authentication into a set of Template for Authentication pieces by a division algorithm and provided the set of Template for Authentication pieces to the authentication management server 130. When the terminal 150 provides User Registration Information or User Authentication Information to the registration server 110, the information may also be encrypted for security.

Figure 2:
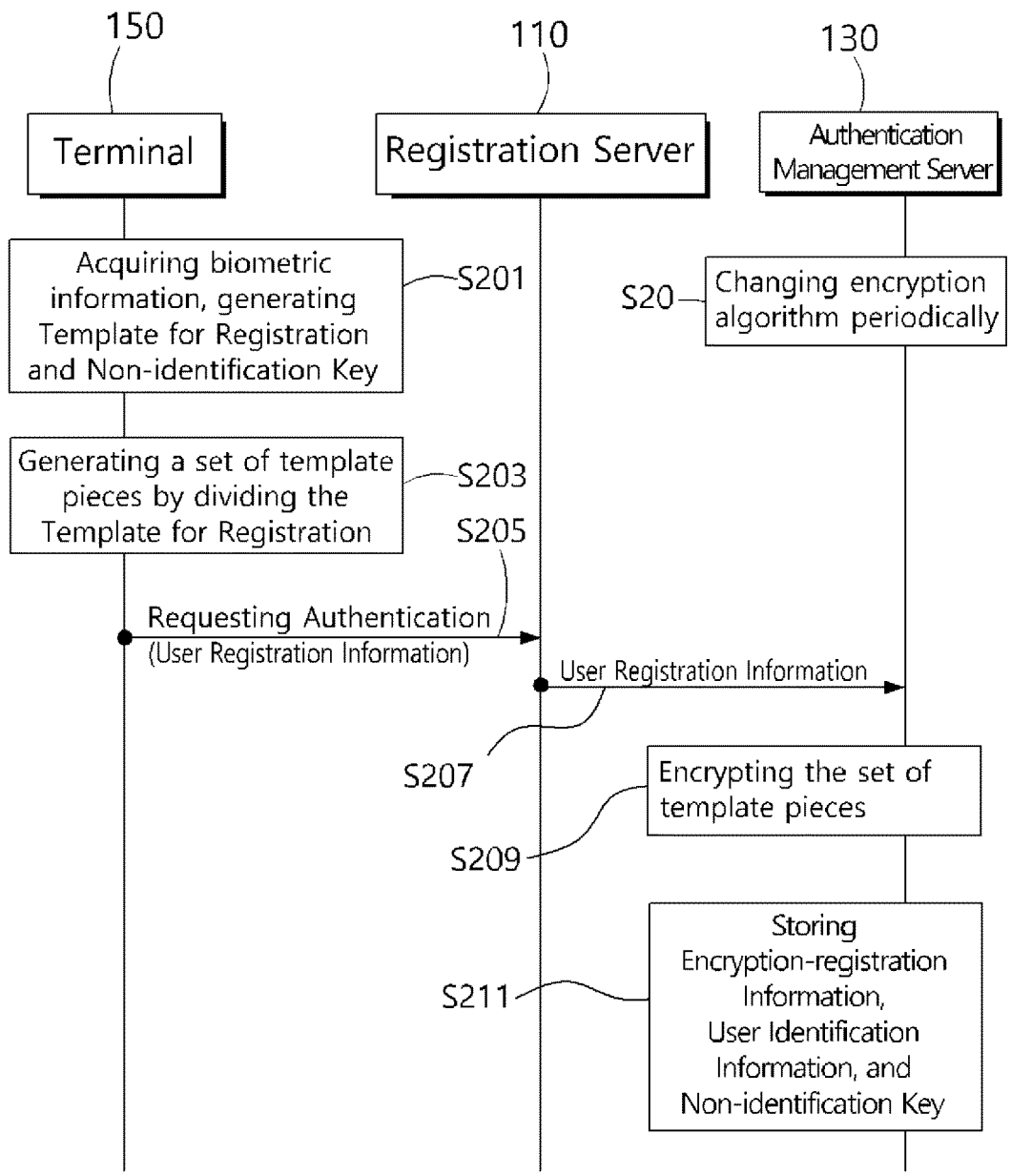
FIG. 2 illustrates a flowchart provided to explain a user registration process for a biometric authentication method according to the present invention.

Hereinafter, a biometric authentication method of the present invention is described with reference to FIG. 2.

<Periodic Changing of Encryption Algorithms: S20>

The authentication unit 133 prepares an encryption algorithm for encrypting a set of template pieces that is one of User Registration Information of the user, and changes the encryption algorithm periodically.

<Generating a Template for Registration: S201>

The terminal 150 receives User Identification Information from the user to be registered through the identification information input unit 151. And The terminal 150 obtains biometric information of the user using the biometric information input unit 153, generates a Template for Registration using the biometric information. The terminal 150 assigns a Non-identification Key to identify the newly generated Template for Registration.

According to the embodiment, the terminal 150 may inquire to the authentication management server 130 whether the user is already registered or not, before generating the Template for Registration. For this purpose, the terminal 150 may provide User Identification Information to the authentication management server 130 to ask if there is a Non-identification Key already mapped to the User Identification Information and registered. As in steps S303 and S305, the authentication unit 133 verifies the Non-identification Key inquiry, and answers to the terminal 150.

<Generating a Set of Template Pieces: S203>

The terminal 150 generates a set of template pieces by dividing the Template for Registration according to a preset division algorithm.

<Requesting User Registration: S205>

The terminal 150 generates User Registration Information including the User Identification Information and the Non-identification Key of S201 and a set of template pieces of S203, and provides the User Registration Information to the registration server 110 to request user registration.

<Registration Procedure: S207 to S211>

After receiving the registration request of S205, the registration server 110 provides User Registration Information to the authentication management server 130 (S207). The authentication management server 130 converts a set of template pieces into Encryption-registration Information (S209) and registers the user by storing the Encryption-registration Information together with an encryption key, the User Identification Information, and the Non-identification Key in the data storage unit 135 (S211). To register the user, the authentication management server 130 may further perform other processes in addition to step S211, but that is not essential to the present invention.

User registration is performed in the above method. The registration server 110 and the authentication management server 130 may register a plurality of users by repeating the steps of FIG. 2 for each user.

Figure 3:
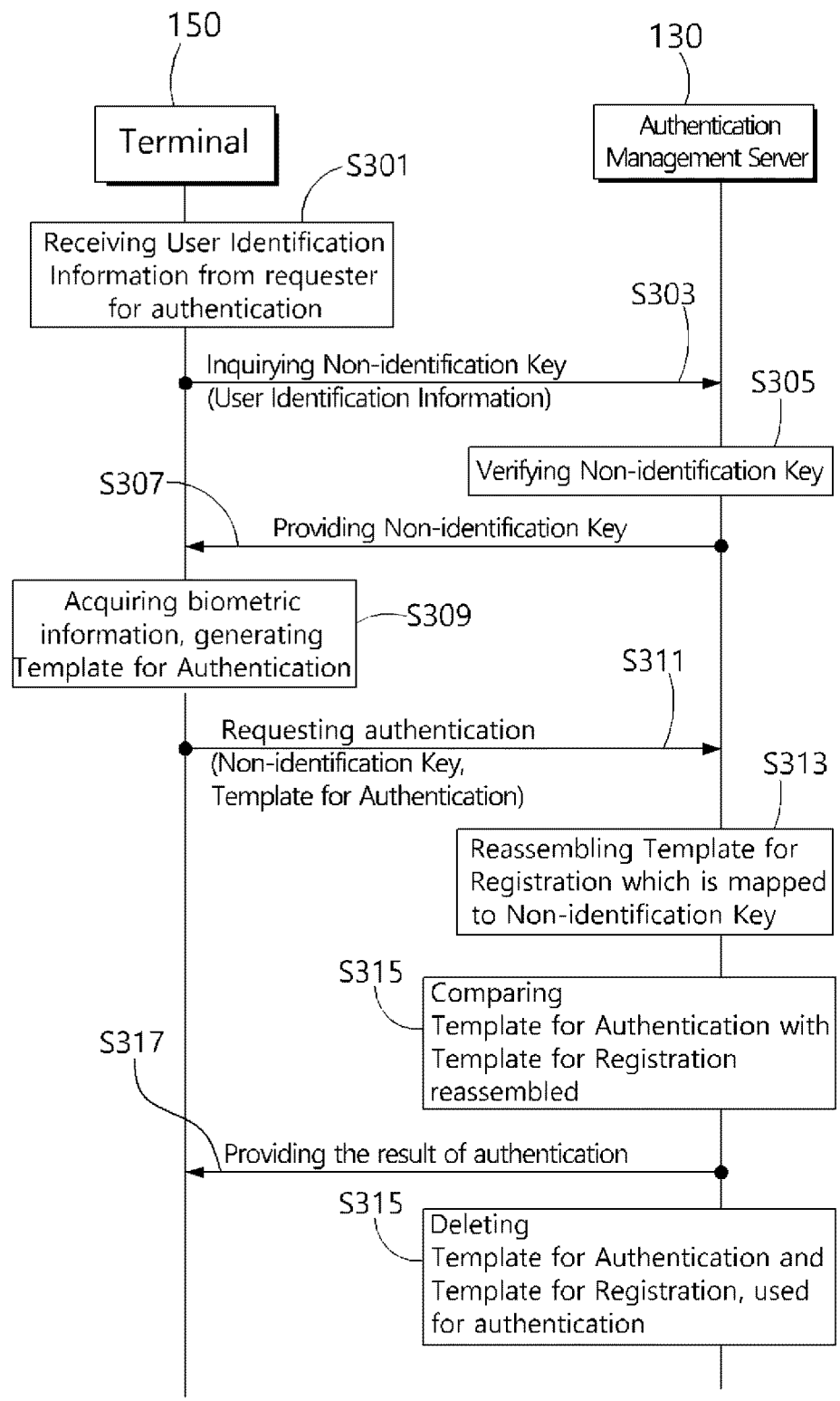
FIG. 3 illustrates a flowchart provided to explain a user authentication process in a biometric authentication method according to the present invention.

Hereinafter, a method for user authentication is described with reference to FIG. 3.

<Inquiring Non-identification Key for User Authentication: S301 to S307>

According to a new request for user authentication, the terminal 150 receives User Identification Information from the requester through the identification information input unit 151 and provides the User Identification Information to the authentication management server 130 to inquire about the Non-identification Key registered in the name of the requester. (S301, S303)

The authentication unit 133 verifies whether there is a Non-identification Key mapped to the User Identification Information received at step S303. (S305).

If there is a Non-identification Key mapped to User Identification Information, the authentication unit 133 provides the Non-identification Key to the terminal 150. If there is a Non-identification Key, it means that the requester is a pre-registered user, and the authentication unit 133 can know that the authentication procedure for the requester has been initiated. If there is not a Non-identification Key mapped to User Identification Information, the authentication unit 133 provides the inquiry result to the terminal 150. (S307)

<Authentication Request by Providing User Authentication Information: S309, S311>

When a Non-identification Key is provided from the authentication management server 130 in step S305, the terminal 150 generates biometric information of the requester through the biometric information input unit 153 because the requester is a pre-registered user. The terminal 150 extracts a Template for Authentication to use for the user authentication from the biometric information (S309). The terminal 150 requests authentication by providing the Template for Authentication together with the Non-identification Key to the authentication management server 130 (S311).

According to an embodiment, the terminal 150 may divide the Template for Authentication into a set of Template for Authentication pieces with a division algorithm used in step S203 and provide the set of Template for Authentication pieces instead of the Template for Authentication in step S311.

<Reassembling the Template for Registration Registered by the Name of the Requester: S313>

The authentication unit 133 reassembles temporarily a Template for Registration registered by the Non-identification Key of the requester which is received in step S311. First, the authentication unit 133 searches Encryption-registration Information mapped to the Non-identification Key in the data storage unit 135, decodes the Encryption-registration Information into a set of Template pieces using the corresponding encryption key, and then reassembles the set of Template pieces into a Template for Registration by using a preset reassembly algorithm.

According to the embodiment, the terminal 150 may provide a set of Template for Authentication pieces instead of the Template for Authentication in step S311. In such a case, the authentication unit 133 must reassemble a set of Template for Authentication pieces into the Template for Authentication with the above reassembly algorithm.

<User Authentication: S315 to S319>

The authentication unit 133 compares the Template for Authentication provided by the terminal 150 in step S309 and the Template for Registration reassembled in step S313 with the same or at least similar to a certain level to authenticate whether the requester is a registered user. (S315).

The authentication unit 133 provides the authentication result to the terminal 150 (S317) and discards the Template for Authentication of step S311 and the Template for Registration temporarily generated in step S313. (S319)

User authentication of the present invention is performed in the above manner.

While this invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A biometric authentication method using user's biometric information, the method comprises a registration process and an authentication process, wherein the registration process comprises:

acquiring, by a terminal, biometric information of the user by using a biometric information input unit, generating a Template for Registration, which is characteristic data of the biometric information, dividing the Template for Registration into a set of template pieces by using a preset division algorithm, and generating a Non-identification Key as an identification code for the set of template pieces;

generating, by the terminal, User Registration Information including User Identification Information which the user inputs, the set of template pieces, and the Non-identification Key, and providing the User Registration Information to a registration server in order to request user registration; and after receiving the User Registration Information, converting, by an authentication management server, the set of template pieces included in the User Registration Information into Encryption-registration Information by encrypting the set of template pieces with an encryption key according to a preset encryption algorithm, wherein the encryption algorithm is periodically changed, and storing the converted User Registration Information together with the encryption key in a data storage unit;

wherein the authentication process comprises:

requesting, by the terminal, authentication of a requester to the authentication management server by providing a Template for Authentication along with the Non-identification Key, wherein the Template for Authentication is acquired from the requester;

extracting, by the authentication management server, Encryption-registration Information mapped to the authentication-requested Non-identification Key from the data storage unit, decoding the extracted Encryption-registration Information with a set of template pieces by using an encryption key mapped to the authentication-requested Non-identification Key, and reassembling the decoded set of template pieces into the Template for Registration according to a preset reassembly algorithm; and authenticating the requester, by the authentication management server, by comparing the Template for Authentication with the Template for Registration reassembled, and discarding the Template for Authentication and the Template for Registration reassembled.

2. The method of claim 1, wherein, in order for acquiring the Non-identification Key used for the requesting authentication, the requesting authentication of the requester comprises:

providing, by the terminal, the User Identification Information to the authentication management server to request an inquiry of Non-identification Key, wherein the User Identification Information is inputted from the requester through an identification information input unit; and searching, by the authentication management server, the Non-identification Key mapped to the User Identification Information provided by the terminal and providing the Non-identification Key to the terminal.

3. The method of claim 1, the method further comprises:

before the terminal generates the User Registration Information, receiving, by the terminal, the User Identification Information from the user to be registered, and inquiring the Non-identification Key to the authentication management server to determine whether the user is a pre-registered user.

4. The method of claim 1, wherein in the requesting authentication of the requester, the terminal divides the Template for Authentication into a set of Template for Authentication pieces using the preset division algorithm and provides the set of Template for Authentication pieces to the authentication management server, and in the reassembling the decoded set of template pieces into the Template for Registration, the authentication management server uses the preset reassembly algorithm to reassemble the set of Template for Authentication pieces into the Template for Authentication.

* * * * *